No. 855,512. PATENTED JUNE 4, 1907.
F. E. HUTSON & R. H. NEAL.
NUT LOCK.
APPLICATION FILED JULY 26, 1906.
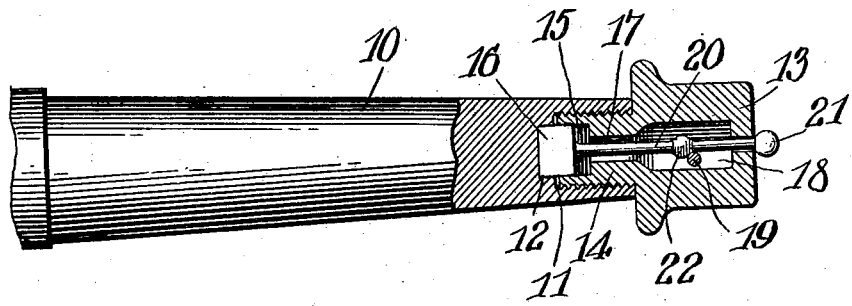
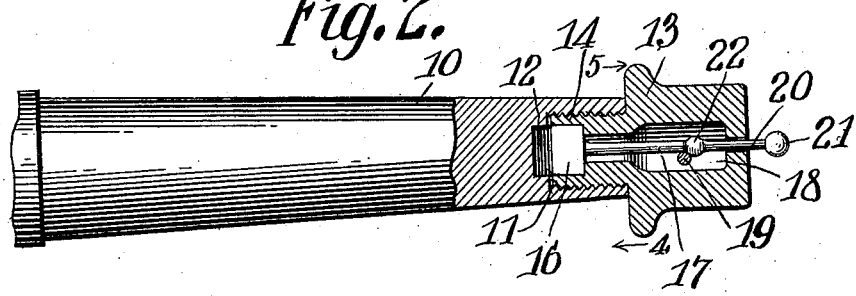
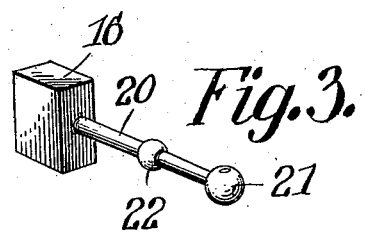
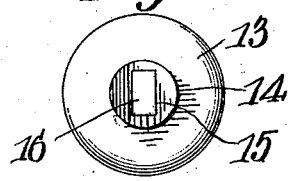
Witnesses
Inventors
Frank E. Hutson and
Robert H. Neal
By
Attorneys

UNITED STATES PATENT OFFICE.

FRANK E. HUTSON AND ROBERT H. NEAL, OF DELANCEY, NEW YORK.

NUT-LOCK.

No. 855,512.　　　Specification of Letters Patent.　　　Patented June 4, 1907.

Application filed July 26, 1906. Serial No. 327,927.

*To all whom it may concern:*

Be it known that we, FRANK E. HUTSON and ROBERT H. NEAL, citizens of the United States, residing at Delancey, in the county of Delaware and State of New York, have invented certain new and useful Improvements in Nut-Locks; and we do hereby declare the following to be a full, clear, and exact description of the invention, such as will enable others skilled in the art to which it appertains to make and use the same.

This invention relates to means for securing a hub upon the spindle of a vehicle axle, and has for an object to provide a nut associated with the spindle and improved means for preventing the displacement of the nut.

A further object of the invention is to provide a vehicle spindle having an associated nut and with improved means slidably carried by the nut and arranged for engagement with the spindle and to prevent rotary displacement of the nut.

A further object of the invention is to provide a nut for association with a vehicle spindle embodying a mortise at one end with a block slidably mounted within the mortise and with a yielding spindle extending outwardly through the nut and provided with means for engaging a pin within the nut for holding the sliding block at either extreme of its movement.

With these and other objects in view, the invention comprises certain other novel constructions, combinations and arrangements of parts, as will be hereinafter fully described and claimed.

Figure 1 is a view of a conventional vehicle spindle associated with the nut forming the subject-matter of this application and with the sliding block shown as engaging both the nut and the spindle. Fig. 2 is a view similar to Fig. 1 showing the sliding block withdrawn from the mortise of the spindle and in position to permit the rotary movement of the nut. Fig. 3 is a perspective view of the sliding block and resilient spindle removed from the nut. Fig. 4 is a view in elevation of the end of the spindle arranged for association with the improved nut and showing the mortise or socket for receiving the sliding block. Fig. 5 is a view in end elevation of the nut showing the sliding block in position.

Like characters of reference designate corresponding parts throughout the several views.

In its preferred embodiment the spindle forming a part of the present invention and shown conventionally at 10 is provided with a screw-threaded opening 11 at its outer end and with an oblong or angular socket 12 formed in the inner end of the opening 11.

For association with the spindle 10 a nut shown as a whole at 13 is provided embodying a reduced portion 14 externally screw-threaded and proportioned to fit and engage the internally screw-threaded opening 11 of the spindle. The nut 13 is provided at the extremity of its reduced portion with an angular or oblong socket 15 conforming substantially in size and shape with the socket 12 of the spindle and within which said socket 15 is disposed a block 16 so proportioned as to be entirely embraced within the said socket 15. The nut 13 is provided with an opening 17 extending axially through the nut and preferably enlarged or expanded in the body of the nut, as shown at 18. Extending laterally through the nut and through the opening 18 and somewhat eccentric relative to the axis of said nut is disposed a pin 19. The block 16 is provided with a resilient spindle 20 extending through the opening 17 and externally of the nut and provided upon the external surface of the nut with a knob or similar hand-hold device 21. The spindle 20 is also provided with an enlargement 22 disposed within the opening 18 and in such position that it engages the pin 19 upon opposite sides, when the block 16 is moved to either extreme of its limit and adapted to pass slidably over the said pin owing to the resiliency of the spindle 20.

In operation the nut is arranged in the position shown in Fig. 1 with the sliding block engaging both the socket 15 of the nut and the socket 12 of the axle spindle whereby a rotary movement of the nut is prevented and the withdrawal of the block is prevented by the enlargement 22 engaging the pin 19. When the nut is to be removed from the axle spindle the block 16 is withdrawn from the mortise 12 in the axle by grasping the knob 21 and moving the block 16 outwardly by a pull upon the said knob, the enlargement 22 passing over the pin 19 owing to the resiliency of the spindle 20. With the block withdrawn as shown in Fig. 2, the nut may be readily and conveniently removed from the axle spindle and the hub removed in the usual manner. When the hub is replaced the nut is screwed into the end of the axle spindle in the usual manner and the block 16 moved to engage the sockets of both the nut and the spindle by pushing the block inward by applying power to the knob 21.

While the manner of locking the nut is shown here as associated with a vehicle axle, and while such lock is especially and peculiarly adapted for locking a nut upon a vehicle spindle, it is to be understood that the application of this invention is not limited to locking nuts upon vehicles, but is applicable and applied to nuts of various kinds and in various associations.

What I claim is:—

1. In a nut lock, a nut provided with an axial opening, a block carried by and slidable relative to the nut, a resilient spindle connected with the block and extending through the axial opening and provided with a handhold externally of the nut, means carried by the resilient spindle to hold the block at either extreme of its movement, and a spindle arranged for association with the nut and provided with a socket proportioned to receive and engage the block.

2. In a nut lock, a nut provided with an axial opening, and with the opening enlarged within the body of the nut, a detent extending transversely of the nut and through the enlarged opening, a block mounted within the axial opening of the nut and movable longitudinally thereof, a resilient spindle rigidly secured to the block and extending through the axial opening and without the nut, means carried by the resilient spindle for engaging the detent within the nut and retain the spindle at either extreme of its movement, and a spindle arranged for association with the nut and provided with a socket arranged to receive and engage the sliding block.

In testimony whereof we affix our signatures in presence of two witnesses.

FRANK E. HUTSON.
ROBERT H. NEAL.

Witnesses:
   HAMILTON J. HEWITT,
   J. EDGAR DOIG.